(12) United States Patent
Vulliez et al.

(10) Patent No.: US 12,226,892 B2
(45) Date of Patent: Feb. 18, 2025

(54) COMPACT PAIRED PARALLEL ARCHITECTURE FOR HIGH-FIDELITY HAPTIC APPLICATIONS

(71) Applicant: The Board of Trustees of the Leland Stanford Junior University, Stanford, CA (US)

(72) Inventors: Margot R. Vulliez, Lavoux (FR); Oussama Khatib, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 225 days.

(21) Appl. No.: 18/022,208

(22) PCT Filed: Sep. 7, 2021

(86) PCT No.: PCT/US2021/049309
§ 371 (c)(1),
(2) Date: Feb. 20, 2023

(87) PCT Pub. No.: WO2022/051726
PCT Pub. Date: Mar. 10, 2022

(65) Prior Publication Data
US 2023/0311337 A1   Oct. 5, 2023

Related U.S. Application Data

(60) Provisional application No. 63/076,258, filed on Sep. 9, 2020, provisional application No. 63/075,252, filed on Sep. 7, 2020.

(51) Int. Cl.
*B25J 13/02* (2006.01)
*B25J 9/16* (2006.01)
*B25J 9/00* (2006.01)

(52) U.S. Cl.
CPC .......... *B25J 13/025* (2013.01); *B25J 9/1689* (2013.01); *B25J 9/0051* (2013.01)

(58) Field of Classification Search
CPC .................................................... B25J 13/025
See application file for complete search history.

(56) References Cited

U.S. PATENT DOCUMENTS

| 9,026,250 B2 * | 5/2015 | Summer ............... A61G 5/1051 901/30 |
| 2003/0005786 A1 | 1/2003 | Stuart |
| 2004/0091348 A1 | 5/2004 | Kong |
| 2010/0019890 A1 | 1/2010 | Helmer |
| 2010/0139436 A1 * | 6/2010 | Kawashima ......... B25J 17/0266 700/260 |
| 2011/0126660 A1 | 6/2011 | Lauzier |

(Continued)

FOREIGN PATENT DOCUMENTS

| WO | WO-2004104814 A1 * | 12/2004 | ............... G05G 7/02 |
| WO | WO-2018212235 A1 * | 11/2018 | ............... B25J 13/02 |

*Primary Examiner* — Daniel D Yabut
(74) *Attorney, Agent, or Firm* — LUMEN PATENT FIRM

(57) ABSTRACT

A versatile, compact, and high-fidelity haptic device is provided. The mechanical transparency of the design and the selection of proper actuation meet the challenges of an accurate and stiff haptic device with high and isotropic force capability. Such a haptic interface enables a precise remote control and provides perfect sense of the task interaction in any environments and applications.

1 Claim, 12 Drawing Sheets

(56) References Cited

U.S. PATENT DOCUMENTS

| | | | | |
|---|---|---|---|---|
| 2012/0090423 A1* | 4/2012 | Helmer | ............ | G06F 3/045 |
| | | | | 74/543 |
| 2012/0234126 A1* | 9/2012 | Gosselin | ............ | B25J 13/025 |
| | | | | 74/490.14 |
| 2017/0024014 A1 | 1/2017 | Chizeck | | |
| 2021/0393350 A1* | 12/2021 | Hongo | ............ | A61B 34/70 |

* cited by examiner $$\dot{X} = J \dot{q}$$

$$\dot{X} = \underbrace{(J_{c1} \quad J_{c2})}_{J_c} \begin{pmatrix} \dot{X}_1 \\ \dot{X}_2 \end{pmatrix}$$

$$\dot{X} = J_c \begin{pmatrix} J_1 \dot{q}_1 \\ J_2 \dot{q}_2 \end{pmatrix}$$

$$J = J_c \begin{pmatrix} J_1 & 0_{3\times 3} \\ 0_{3\times 3} & J_2 \end{pmatrix}$$

Structure and actuation optimization

Multi-objective penalty-based optimizations, minimize goal functions $F_i = F_C + F_{Ri}$

Design constraints: $F_C = \sum_k \alpha_k F_{Ck}$

- Joint range of motion
- Desired workspace
- No singular configuration
- Delta robot assembly upper assembly mode
- Delta robot external working mode
- Joint maximum torque
- Joint effective torque
- Permissible motor/joint inertia ratio

Structural kinematic optimization:

- Maximize dexterity $F_{R1} = \sum_k \sum_i \kappa(J_i(P_k)) + \kappa(C_i(P_k))$
- Maximize compactness $F_{R2} = \sum_k \sum_i \sum_j |h_{j,i}(P_k)|$

Full dynamic optimization:

- Minimize inertia and non-isotropic terms
  $F_{R1} = \frac{1}{n}\sum_k \sum_i \|A_{Di}(P_k)\| + \kappa(A_{Di}(P_k))$
- Minimize needed torque on typical trajectory
  $F_{R2} = \frac{1}{m}\sum_l \max(|\tau(P_l)|)$

FIG. 12

COMPACT PAIRED PARALLEL ARCHITECTURE FOR HIGH-FIDELITY HAPTIC APPLICATIONS

CROSS-REFERENCE TO RELATED APPLICATIONS

This application is a 371 of PCT application PCT/US2021/049309 filed Sep. 7, 2021. PCT application PCT/US2021/049309 claims the benefit of U.S. Provisional application 63/075,252 filed Sep. 7, 2020. PCT application PCT/US2021/049309 claims the benefit of U.S. Provisional application 63/076,258 filed Sep. 9, 2020.

FIELD OF THE INVENTION

This invention relates to haptic devices.

BACKGROUND OF THE INVENTION

Teleoperation is a key aspect of collaborative robotics allowing the human to safely achieve remote tasks in manifold activity areas such as industry, medical, space, or entertainment. The human operates a distant robot (or a virtual avatar) through a teleoperation system, the haptic device, which replicates the sense of touch from the interaction between the robot and the environment. The design of an optimal and versatile haptic device, with accurate force feedback, is a major concern in teleoperation, as it constitutes the interface between the human and the controlled machines. The teleoperation system must be transparent to the user. Precise motions can be generated in an unconstrained and free space (large and singularity-free workspace, low inertia, minimal joint clearance and no friction). In contact, it provides a proper force feedback of the interactions within a large stiffness bandwidth. The present invention addresses the challenges of such a design and presents a novel solution to meet its strong requirements.

SUMMARY OF THE INVENTION

The present invention has been designed to solve above described problems in the art, with the purpose of developing a versatile, compact, and fully parallel, haptic device with high and isotropic force capability. This objective was achieved through the design of a new transparent and compact 7-DOF haptic device based on an original paired parallel architecture. Embodiments of the invention include the following key technical aspects, detailed and illustrated in the following section:

A new paired parallel architecture, coupling two parallel translational manipulators in-parallel to the two extremities of the serial kinematic chain of the device handle, provides the 6 degrees of mobility of the haptic device end-effector. This architecture leads to quasi-isotropic high-dynamic performances and low coupling between rotation and translation movements.

A generic transparent and compact cable-driven transmission system designed to transmit torque and motion between each actuator and arms' actuated joint of the haptic device.

A customized high-lead ball-screw mechanism, forming the handle body and shaft, ensures the self-rotational torque/motion of the end-effector.

An ergonomic actuated gripper, integrated inside the handle, provides a seventh degree of freedom to the haptic device, which is a grasping capability and fingertip force feedback.

By combining these components within the paired parallel architecture, the haptic device of this invention is a high-fidelity, versatile, and compact teleoperation system. The mechanical transparency of the design and the selection of proper actuation meet the challenges of an accurate and stiff haptic device with high and isotropic force capability. Such a haptic interface enables a precise remote control and provides a good perception of the task interaction in any environments and applications.

In one embodiment, the paired parallel architecture is summarized as:

In one example, a paired parallel architecture coupling two independent parallel mechanisms, in-parallel to the end-effector, to increase the mobility and workspace of the robot, while conserving the properties of the basic mechanisms.

In another example, a compact paired parallel kinematics to meet the challenging requirements of haptic devices. The mechanical architecture has two parallel translational manipulators (see FIG. 1): a lower classic Delta mechanism (110) and an upper 2-leg and 4-DOF (Degrees of Freedom) Delta-like structure (120). These manipulators are linked in-parallel to the device helical handle (130) by two serial kinematic chains, respectively a modified universal joint (140)—lower coupling—and a 3R (Revolute) gyroscopic mechanism (150)—upper coupling. Through these couplings, the displacements of the two basic manipulators (110, 120) are transmitted in two points of the end-effector and, therefore, generate the translational and tilt motions of the handle. The $6^{th}$ DOF is obtained thanks to the integration of a tailor-made helical joint inside the handle which transforms the relative displacement of the manipulators into the handle self-rotation. Overall, the paired parallel architecture provides quasi-isotropic and high-fidelity rotational and translational motions and forces at the end-effector in an integrated and compact way. Such a paired structure also gives similar dynamic capabilities in translation and rotation, with a very low coupling limited to the linkage equation of the helical handle.

In yet another example, the lower manipulator (110) generates the orientation of the handle. It is composed by three parallel kinematic chains, between the base and mobile platforms, in an upside-down hyperstatic Delta-type arrangement: actuated revolute joint-arm-passive R-joint-four-bar parallelogram mechanism with passive R-joints-passive R-joint.

In yet another example, the upper manipulator (120) produces the translational motion of the handle, supported at the center of its mobile platform. To ensure a large access to the handle, only two hyperstatic Delta-like legs transmit the motion to the platform and are placed at 90° from each other. An additional 3-bar parallelogram assembly is linked in parallel to the arm to actuate the second revolute joint of each Delta-type leg. This modified Delta structure has a total of 4 actuated DOFs, both driving the three directions of translational motion and constraining the last rotational mobility. Such a 2-leg 4-DOF Delta-like manipulator gives high and quasi-isotropic force capabilities to the device while conserving a large and easy access to the handle.

In yet another example, the gyroscopic mechanism (150) places the handle at the concurrent center of the three rotational mobilities of this upper coupling, which reduces the inertial effects of the handle on the torque feedback. The modified universal joint (140) introduces a small offset between the respective axes of the two revolute joints to get a frictionless and large range of motion.

In yet another example, the customized helical handle (130) provides the self-rotational torque/motion of the end-effector. To accurately convey motion and force from or toward the user, the helical transmission system must be reversible and frictionless. A compact tailor-made high-lead (e.g. 120 mm) precision ball-screw mechanism is designed to form such a helical joint inside the handle. The handle is divided into a grasp-diameter (e.g. 44 mm) body fixed to a 3-part grooved nut, closed by two recirculation caps, which rolls on e.g. ⅛" balls on the three helical threads of the shaft.

In yet another example, an additional actuated gripper is embedded inside the handle body to endow the device with grasping capability and fingertip force feedback. The gripper has two serial chains for the thumb and index fingers, respectively a passive R-joint and a 2R chain where only the first joint is active. The two passive joints enable to naturally move the finger distal phalanges when remotely grasping an object.

In yet another example, a compact capstan-based transmission system transmits torque and motion, with a high-ratio coupling (e.g. 1/10), from each grounded motor to the leg actuated joints of the two translational manipulators (110, 120). This cable-driven transmission system has a helical driving pulley—guiding the cables within the groove and rigidly clamped to the motor axis—and a flat driven pulley—directly integrated in the shape of the controlled arm. Two Vectran fiber cables, used to reduce slipping and elongation issues, are attached to the helical pulley at one end and tensed around a reel on the flat pulley at the other end.

In still another example a haptic device has a paired parallel architecture formed by a first parallel translational manipulator and a second parallel translational manipulator together providing a 6-DOF motion of a reversible friction-less helical end-effector of the haptic device to which first and second manipulators are coupled in parallel. The reversible friction-less helical end-effector is attached to the first and second parallel translational manipulators through two serial kinematic chains enabling a transformation of displacements of the first and second parallel translational manipulators into translational and rotational motions of the reversible friction-less helical end-effector, and transmission of torques from the first and second parallel translational manipulators to generate 6-DOF haptic feedback in an operational space of the haptic device.

The above embodiments form together a versatile, compact, and high-fidelity haptic device. The mechanical transparency of the design and the selection of proper actuation meet the challenges of an accurate and stiff haptic device with high and isotropic force capability. Such a haptic interface enables a precise remote control and provides perfect sense of the task interaction in any environments and applications.

BRIEF DESCRIPTION OF THE DRAWINGS

FIG. 12 shows according to an exemplary embodiment of the invention considerations for structure and actuation optimization for a haptic device.

DETAILED DESCRIPTION

Paired Parallel Architecture

Embodiments of the invention are based on a paired parallel architecture providing 6 degrees of freedom of the mechanism in a very compact, stiff, and light fashion, while conserving isotropic capabilities over the workspace and a simple closed-form modeling.

Figure 1:
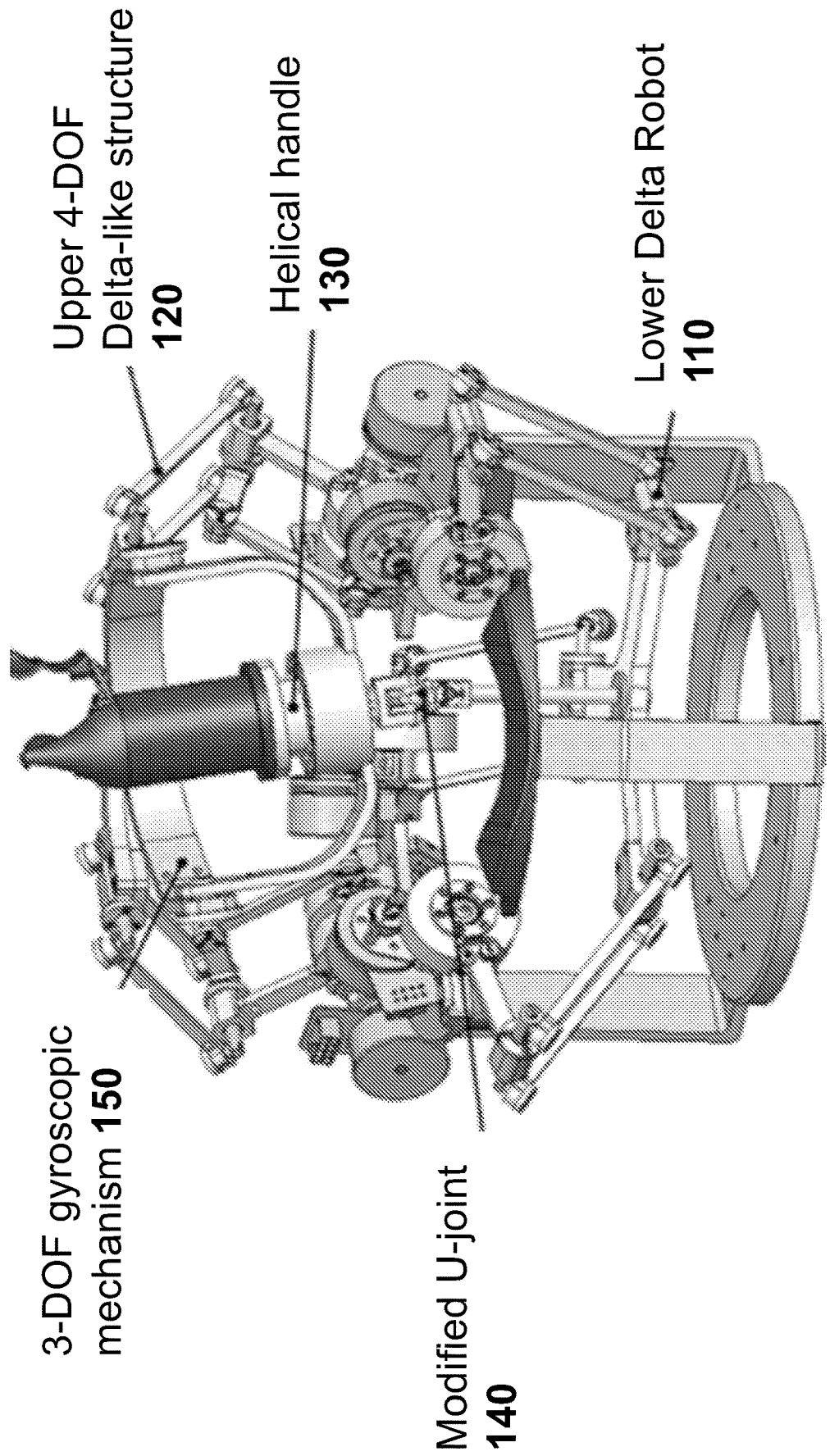
FIG. 1 shows according to an exemplary embodiment of the invention the paired parallel architecture main components. The main technical aspect is a paired parallel architecture, linking two translational parallel manipulators in-parallel to the helical end-effector to provide the 6 degrees of freedom of the device. 110=A lower classic Delta mechanism, 120=An upper 2-leg and 4-DOF Delta-like structure, 130=Device helical handle, 140=A modified universal joint, and 150=A 3R (Revolute) gyroscopic mechanism.
Figure 2:
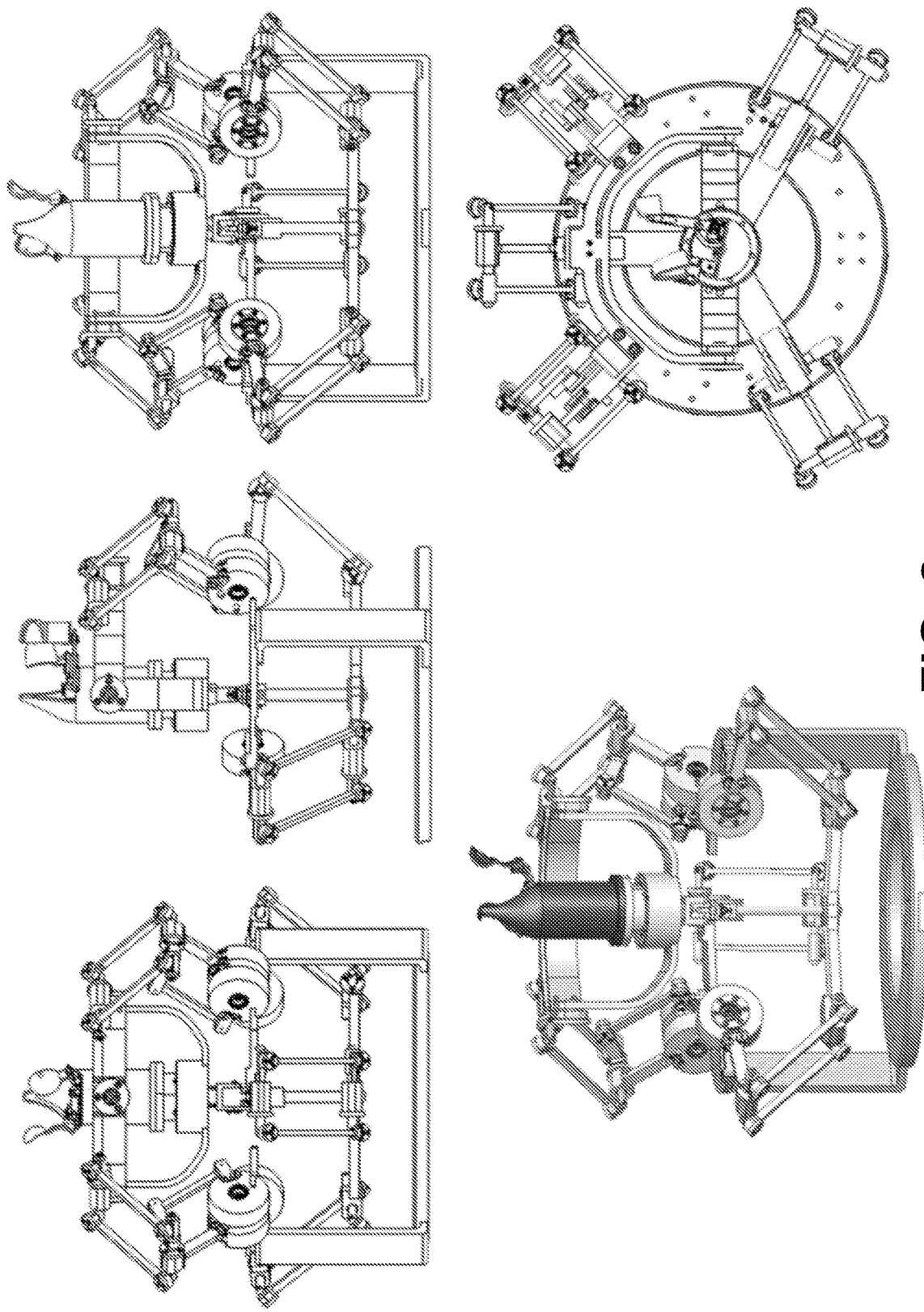
FIG. 2 shows according to an exemplary embodiment of the invention overall views of the haptic device assembly. A compact and versatile haptic device is designed based on the paired parallel architecture and offers high stiffness, low inertia, and high dynamic capabilities.

FIG. 1 describes the basic constituent components of the haptic device architecture. The structure has two parallel translational manipulators, linked in-parallel to the end-effector to get the 6 degrees of freedom of the device, with only grounded actuators (low device inertia). The translational motions of the two basic parallel manipulators are transmitted in two points of the end-effector through a spherical gyroscopic mechanism (upper coupling) and a modified universal joint (lower coupling). These couplings transform simultaneous translational motions of the manipulators into the handle translation and their relative displacements into the tilt orientation of the end-effector. The self-rotation of the handle is obtained due to the integration of a helical joint between its body and shaft. This original paired architecture offers similar dynamic capabilities in translation and rotation, which are directly related to the performances of the basic translational manipulators. The architecture also leads to a fully parallel device with a very low rotational/translational coupling, limited to the linkage equation of the helical handle. Different figure views of the compact haptic device, which has been designed based on the paired parallel architecture, are shown in FIG. 2. It is worth noting that apart from this haptic device example, the architecture can constitute the basis of a 6-DOF parallel compact mechanism in various applications.

Figure 3:
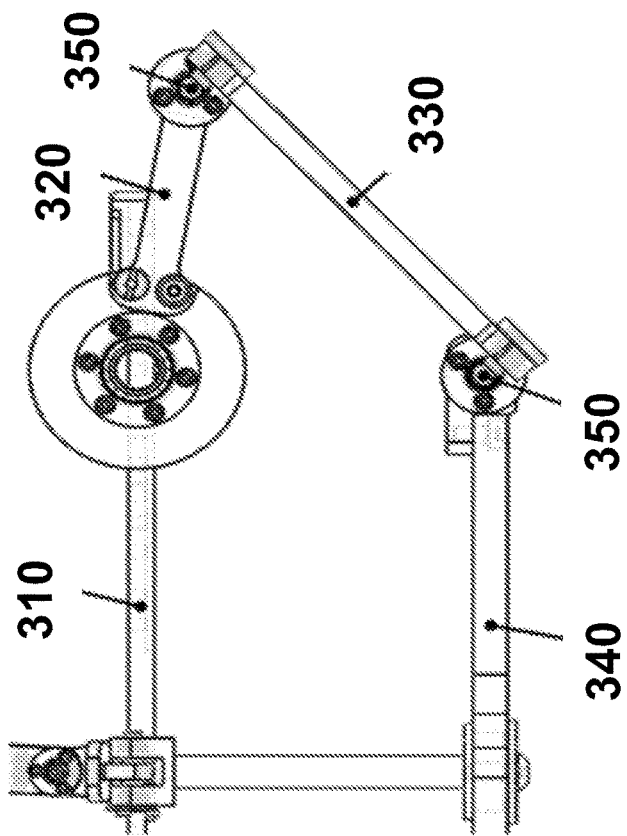
FIG. 3 shows according to an exemplary embodiment of the invention the architecture of the lower translational manipulator for the haptic device. The lower basic manipulator has a Delta-type structure, which offers isotropic high-dynamic behavior for the rotational motion in a compact and stiff way. 310=base platform, 320=arm, 330=parallelogram bar, 340=mobile platform, and 350 parallelogram rod.
Figure 3:
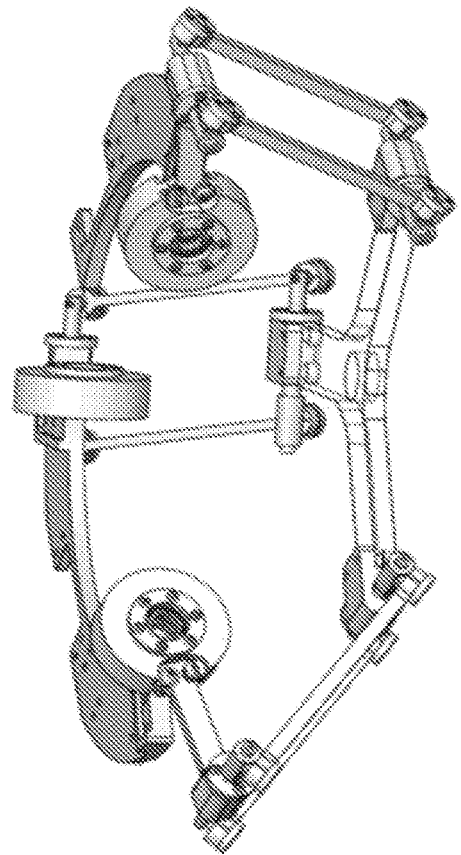

The choice of the parallel translational manipulators of the paired architecture is made to meet the compacity and accessibility requirements of a versatile haptic device. The lower translational manipulator, which creates the rotational degrees of freedom of the handle relatively to the upper manipulator, is composed by three parallel kinematic chains in a hyperstatic Delta-type arrangement, as shown in FIG. 3. Each leg has one arm, linked to the base platform through an actuated revolute joint, and associated with one R-joint four-bar parallelogram mechanism linked to the mobile platform. The Delta arrangement has a compact and stiff structure with a large and isotropic workspace and simple kinematic and dynamic models. The high compacity is ensured by reversing the lower Delta robot and placing the moving platform under the haptic device base.

Figure 4:
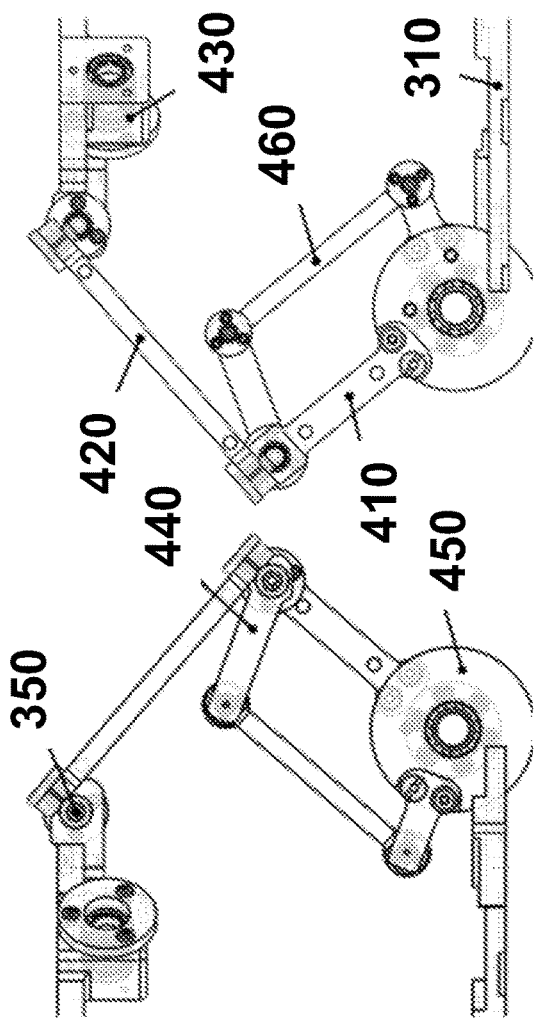
FIG. 4 shows according to an exemplary embodiment of the invention the architecture of the upper translational manipulator for the haptic device. A 4-DOF modified Delta-type architecture was chosen for the upper translational manipulator. This structure gives high and isotropic translational force capabilities to the device while conserving a large and easy access to the handle. 410=arm, 420=parallelogram bar, 430=mobile platform, 440=redundant parallelogram rod, 450=redundant arm, and 460=redundant parallelogram bar.
Figure 4:
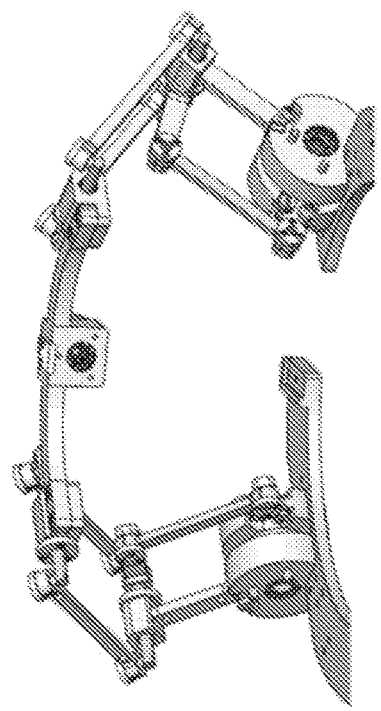

The upper translational manipulator shown in FIG. 4, mostly generates the translational motion of the handle. The challenge of this manipulator is to allow a large access to the device handle to the user while staying compact and isotropic. A 2-leg Delta-like arrangement is designed for this purpose. As isotropic and high force feedback are required for the translational mobilities, a symmetric additional actuation drives the second DOF of each leg for this 2-leg 4-DOF modified Delta robot. The force/motion transmission from the grounded actuator to this second joint is given by linking in-parallel a second kinematic chain to the first parallelogram rod of the classic Delta leg. The redundant chain has three bars in a parallelogram assembly, connected together by revolute joints, linked to the base platform through the second actuated R-joint and rigidly attached to the parallelogram rod. This redundant leg drives the second R-joint of the Delta leg, which gives a total of 4 actuated joints to drive the 3-DOF translational motion of the platform and constraint its last free rotational mobility.

Figure 5:
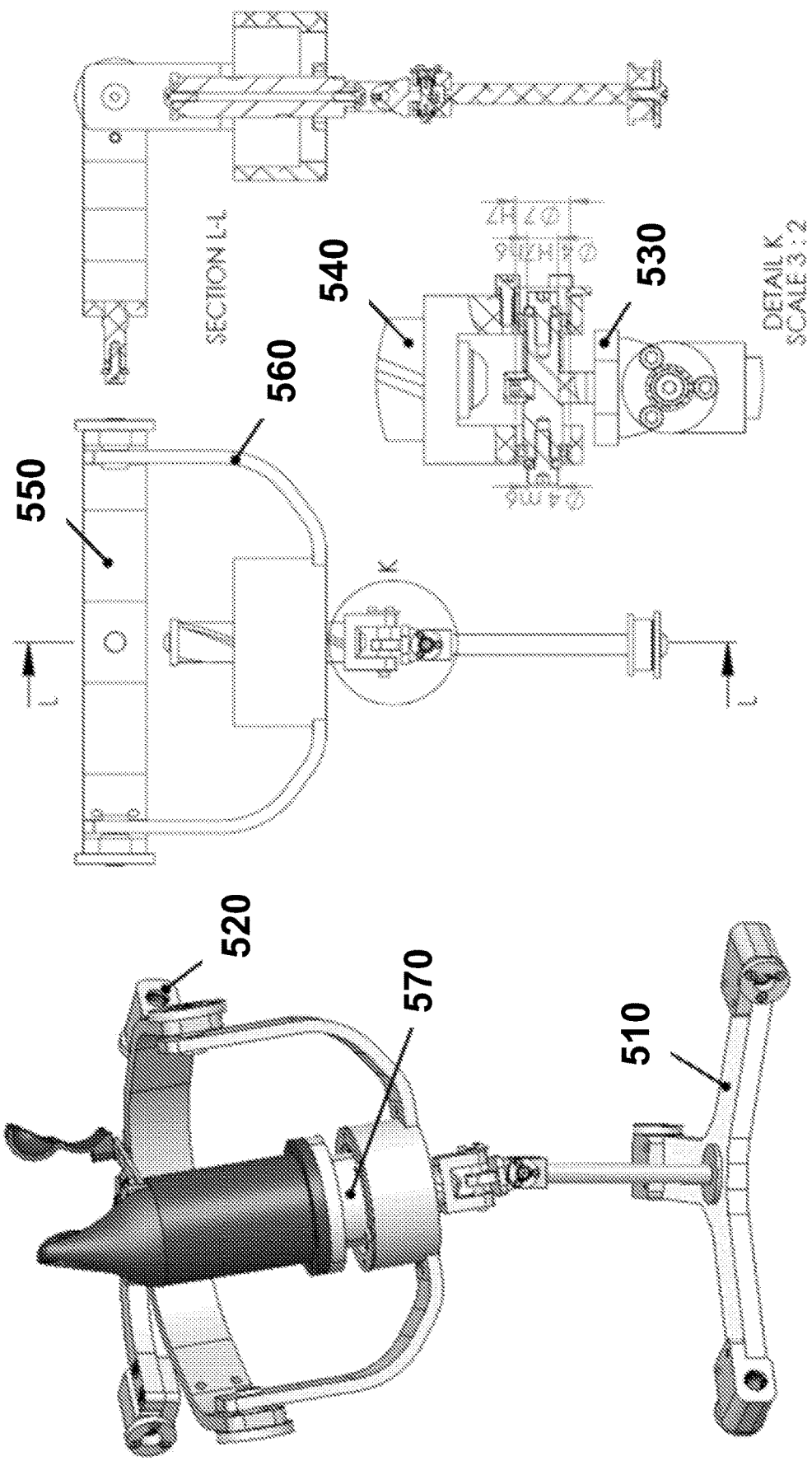
FIG. 5 shows according to an exemplary embodiment of the invention a description of the serial couplings between the handle and the two Delta mobile platforms (510, 520). Forces and motions are transparently transmitted from the Delta platforms to the handle body and shaft via an upper 3-DOF gyroscopic mechanism and a lower modified universal joint. 530=cardan shaft, 540=handle shaft, 550=external gimbal, 560=internal gimbal and 570=handle body.

The 6 degrees of freedom of the haptic device are then transmitted from the translators' platforms to the body and shaft of the helical handle thanks to an upper 3R-joint gyroscopic coupling and a lower offset universal joint as shown in FIG. 5. The design of these joints is crucial to conserve the mechanical transparency of the haptic device as they should perfectly transfer the force feedback to the user without constraining the handle motion. The 3R-joint coupling between the upper 4-DOF modified Delta robot and the body of the handle is designed to enable the rotation axes of the handle to be concurrent. A 3-DOF gyroscopic mechanism places the handle at the center of rotation of this upper link, which reduces the inertial effects of the handle on the torque feedback, and locates it at the center of the 4-DOF modified Delta platform, which increases the compactness of the haptic device. The handle shaft is connected to the lower Delta platform by a modified universal joint, achieved by combining two revolute joints with a small offset between their respective axes. This arrangement leads to a large range of motion and frictionless universal joint.

Friction-Less and High-Lead Helical Handle

Figure 6:
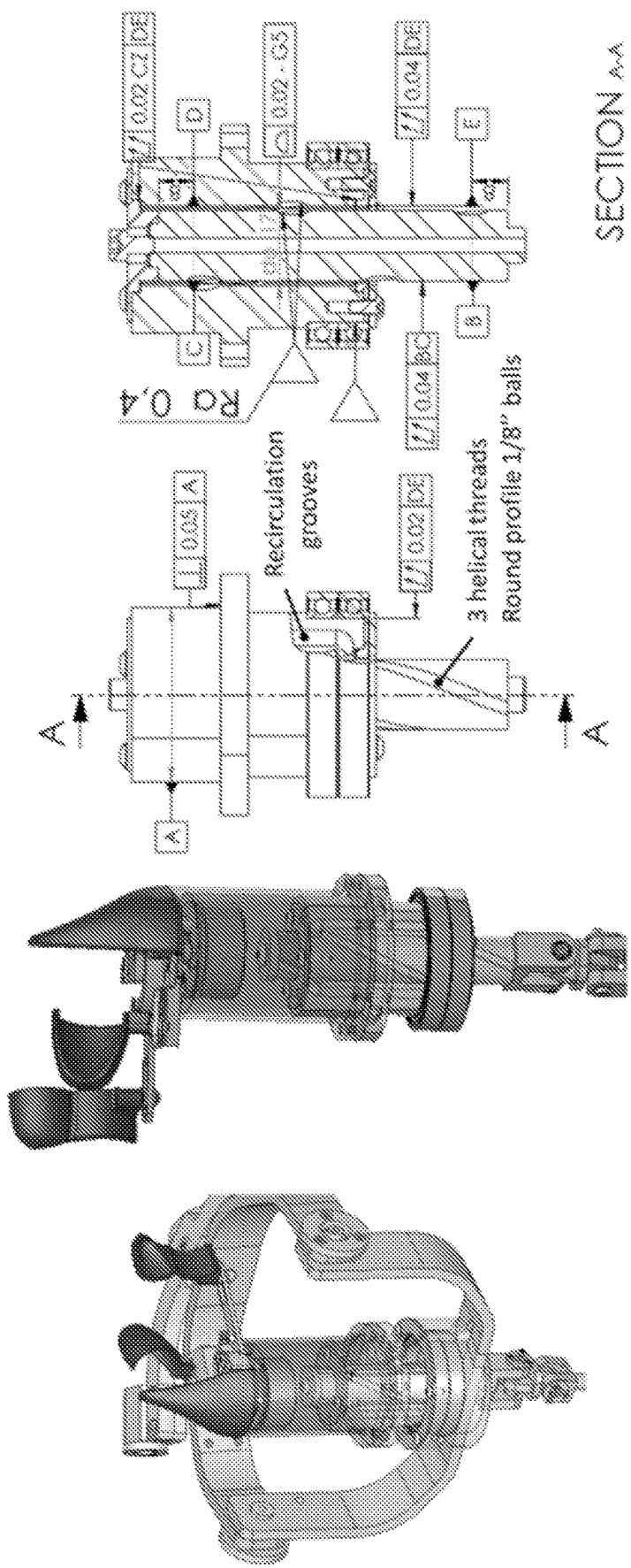
FIG. 6 shows according to an exemplary embodiment of the invention tailor-made helical transmission system in the end-effector. A friction-less high-lead helical end-effector is needed to transmit the self-rotational torque and motion of the haptic device. A customized reversible precision ball-screw is designed and integrated inside the handle body.

The second aspect of the invention comes from the integration of a helical transmission system, located inside the end-effector, to transfer the last rotational degree of freedom in the operational space. This original end-effector is a key component of the architecture, but requires developing a specific helical transmission to conserve the transparency of the teleoperation system. The customized helical transmission system is shown in FIG. 6.

The design of this helical joint is primordial to create an optimal 6-DOF haptic device. The transmission system must be perfectly reversible to accurately convey the position commands of the user without generating any motion constraint. The helical thread must also transmit an adequate and precise self-rotational torque feedback. An optimization of the transmission's geometric parameters, according to the maximal prescribed torque feedback over the workspace and human hand ergonomic criteria, has fixed an optimal high lead of e.g. 120 mm within a maximal nut diameter of e.g. 40 mm. To offer a high transparency, the helical transmission must have minimum friction, which requires the use of rolling elements in the joint thread. A tailor-made precision ball-screw is designed to form such a friction-less high-lead helical end-effector. The ball-screw has 3 helical round threads for e.g. 1/8" balls and integrates recirculation grooves in the 3-section and 2-cap nut. To achieve a compact and integrated solution, the shaft of the handle becomes the screw of the transmission system and the body of the handle is attached to the nut.

Integration of an Actuated Ergonomic Gripper

The handle is a major component of a haptic device as it constitutes the direct human-robot interface, allowing the human to command the motion of the controlled robot and rendering the perception of the task interaction. To be easily operable, the handle is ergonomically designed with respect to the anthropometric data of the human hand and a comfortable shape and material are chosen for the body.

Figure 7:
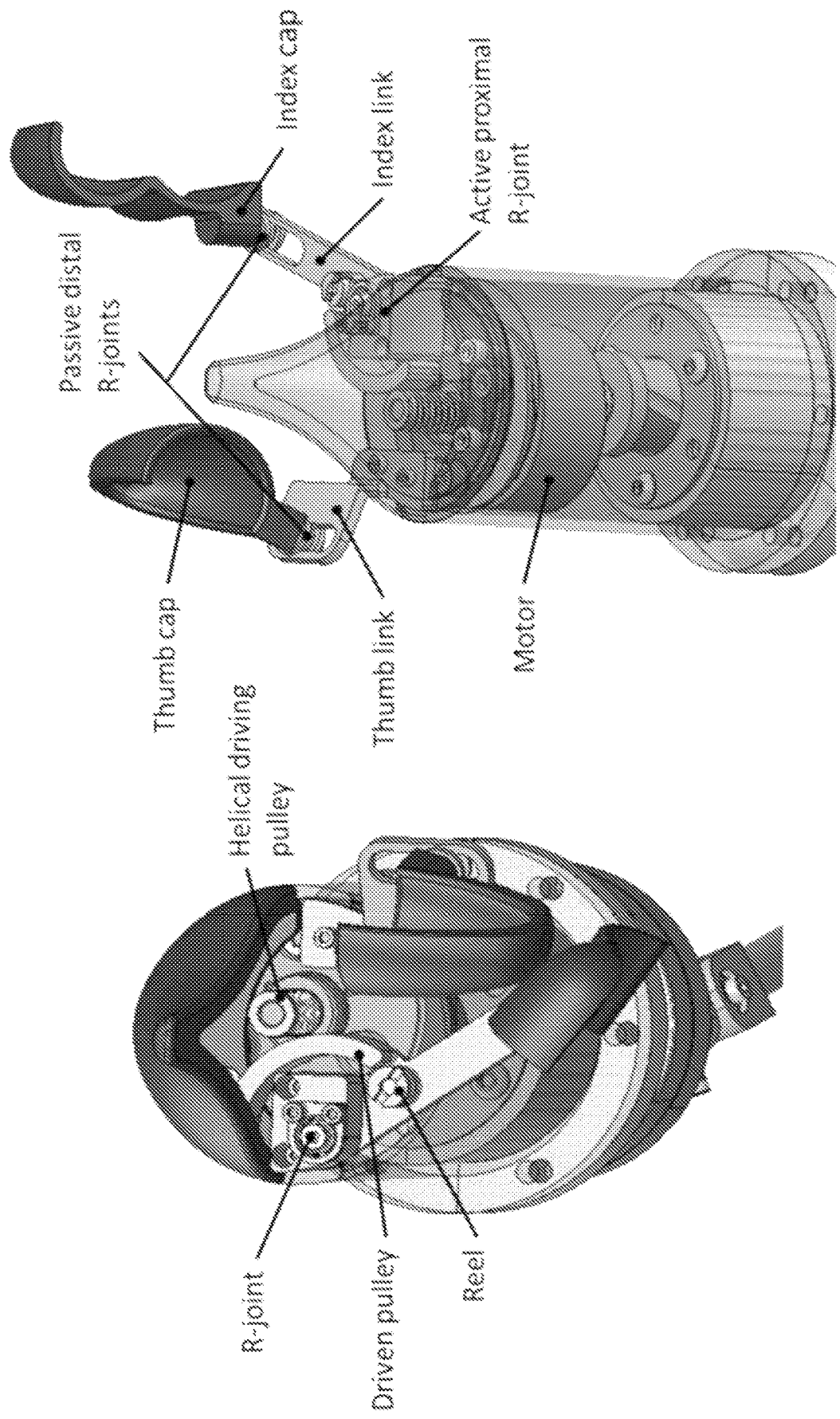
FIG. 7 shows according to an exemplary embodiment of the invention a handle body and its embedded actuated gripper. A compact actuated gripper is included in the handle to add grasping capabilities and fingertip feedback to the haptic device.

A versatile haptic device must integrate the entire remote control of the robot from the handle in an easy way. Therefore, a compact actuated gripper is included inside the handle to add grasping capabilities and fingertip force feedback to the haptic device as shown in FIG. 7. The gripper is developed according to the kinematics of the human fingers and comprises two serial chains for the thumb and the index fingers. The thumb link has a passive revolute joint while the index chain combines a first actuated R-joint with another passive R-joint. The two passive joints enable the human to naturally move his/her distal phalanges when remotely grasping an object. The kinematics leads to the first gripper for grounded haptic devices integrating intuitive grasping capabilities for the user by covering the usual grasp taxonomy (pinch, power, and spherical grasps). The user fingers are inserted and attached to thumb and index caps respectively which provide the grasping tactile feedback as a force driven by the embedded motor and capstan transmission system. The caps are magnetically fixed to the finger serial linkages and can be released with a certain force to preserve the human safety.

Transparent and Compact Transmission System

Figure 8:
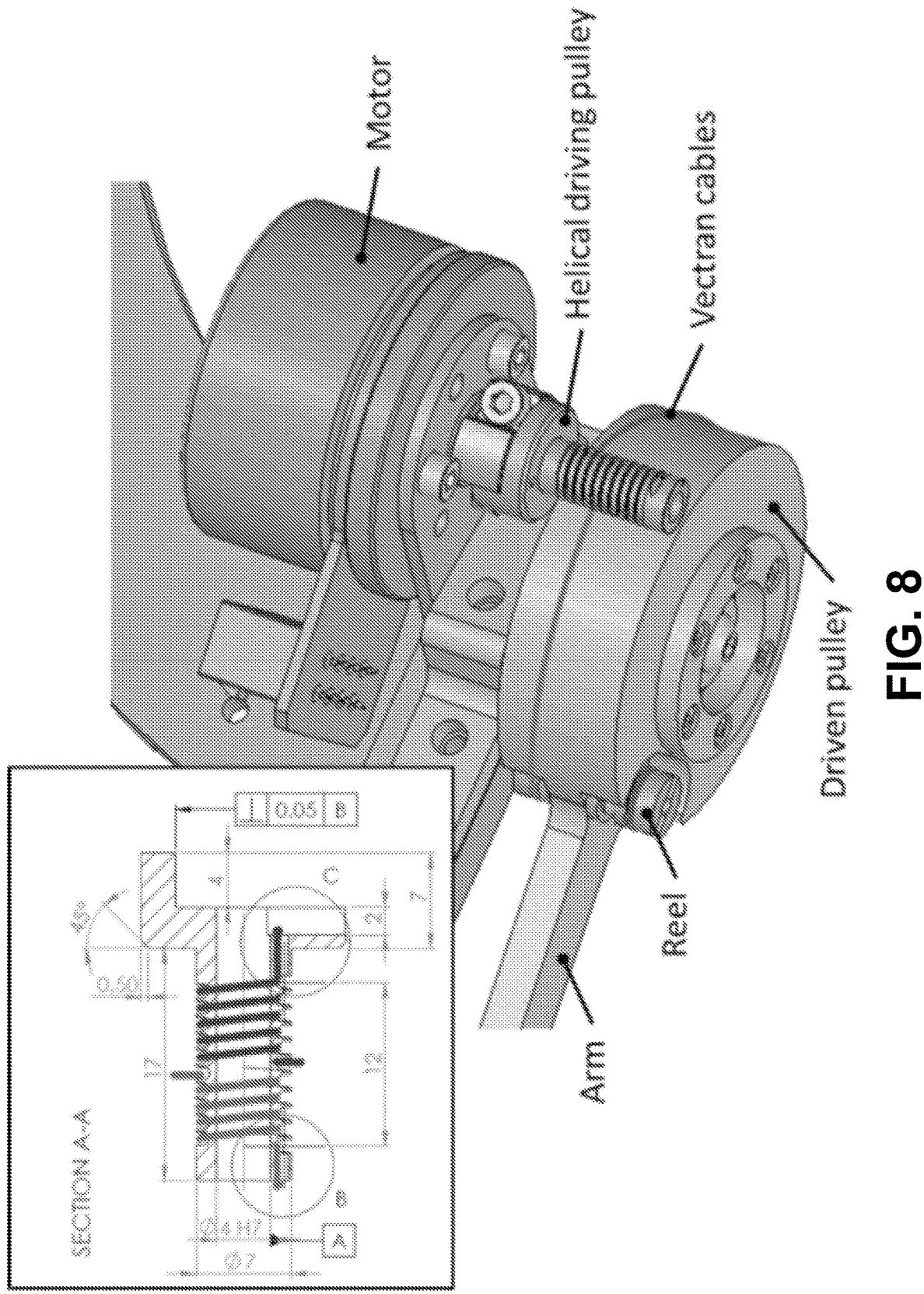
FIG. 8 shows according to an exemplary embodiment of the invention a transparent, compact, cable-driven transmission system. A generic and integrated cable-driven transmission system ensures the high-ratio coupling between the motors and the controlled arms in a very compact solution.
Figure 9:
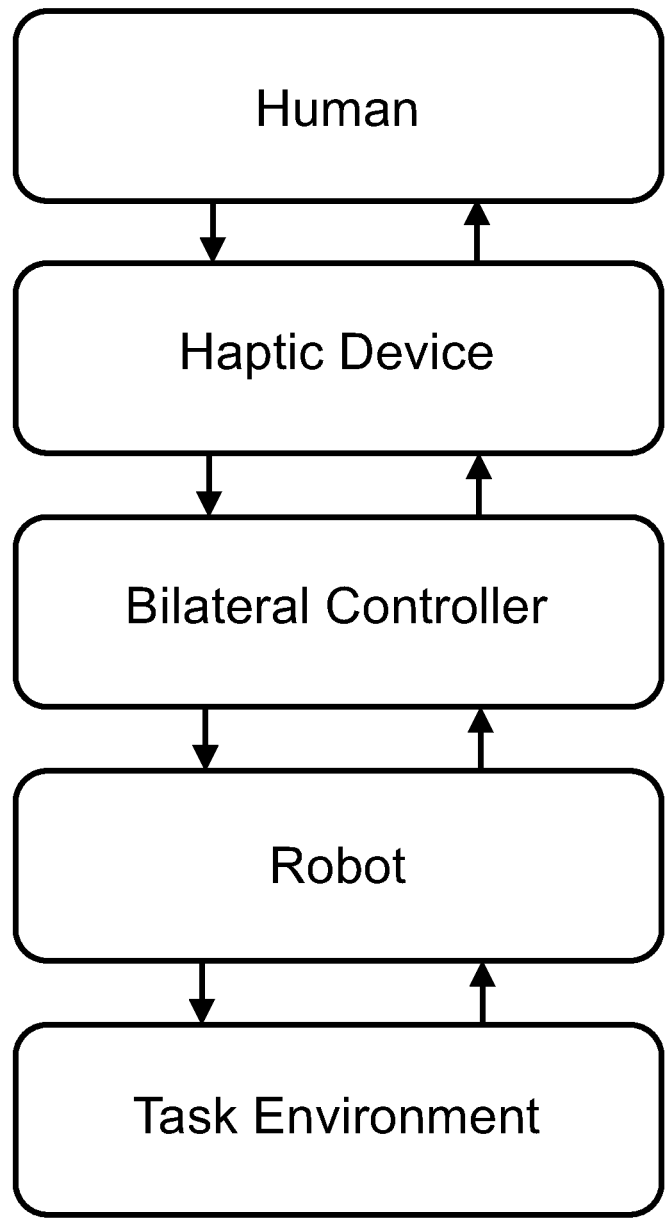
FIG. 9 shows according to an exemplary embodiment of the invention a haptic teleoperation scheme. The haptic device is a task-oriented and control-aware design. Most manipulation tasks involve physical interactions. Teleoperation requires high-fidelity haptic feedback since each application involves different levels of interaction with the task-related environment. The teleoperation scheme must comprise a high-fidelity haptic feedback to replicate task-related interaction to the user.
Figure 10:
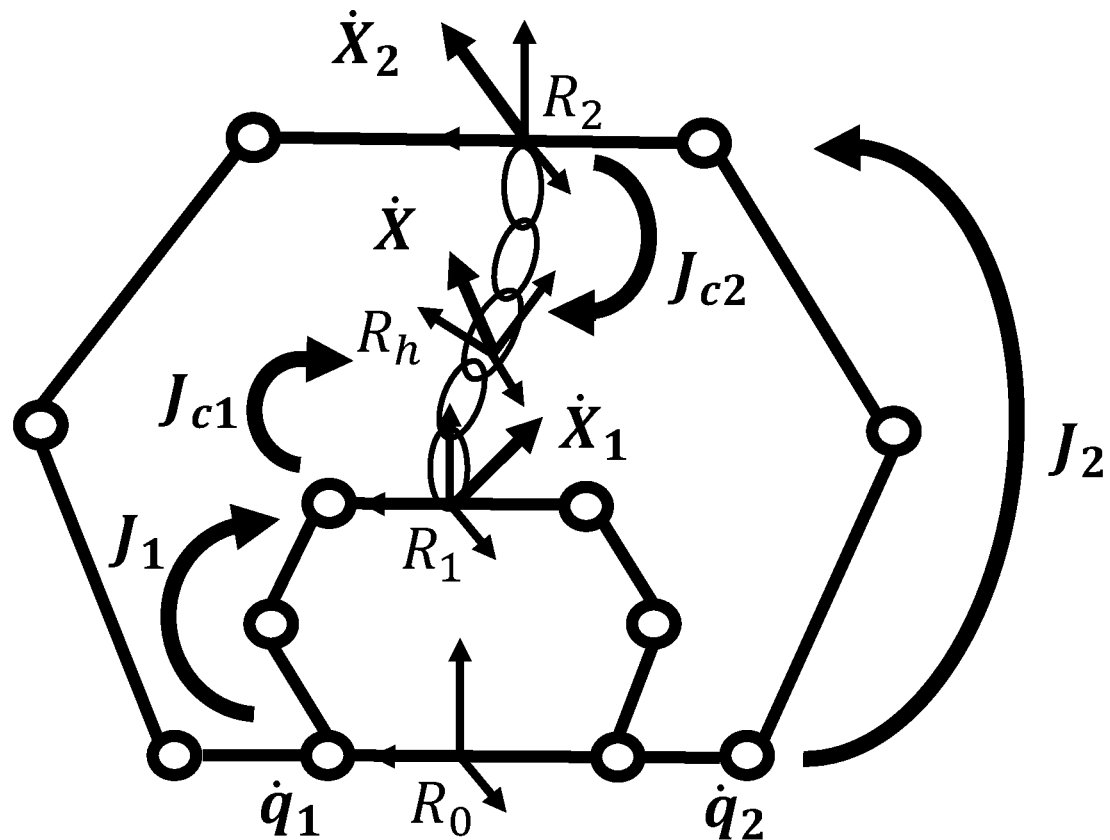
FIGS. 10-11 show according to an exemplary embodiment the kinematic and dynamic modeling of the paired-parallel architecture, which has simple closed-form equations.
Figure 11:
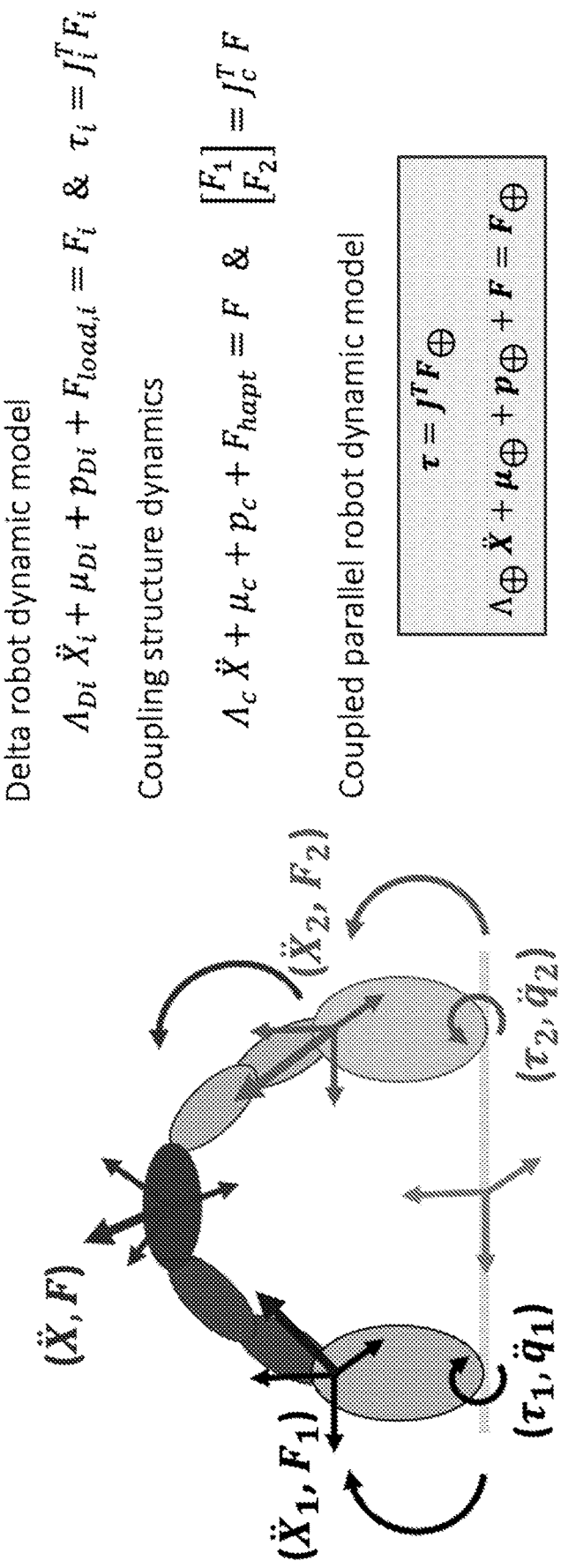

All the device actuated R-joints are driven by a motor coupled to a transparent and compact capstan-based transmission system. The design of a generic, compact and integrated cable-driven transmission system is the last technical novelty of the invention. The capstan-based transmission system, shown in FIG. 8, transmits the angular motion and torque from the motor to the controlled arm. It has a helical driving pulley-guiding the cables within the groove and rigidly clamped to the motor axis-a flat driven pulley-directly integrated in the shape of the controlled arm-two fiber cables, and two reels. Two cables are used to avoid slipping problems and to reduce the flexibility errors. Each cable is attached to the motor shaft by the helical pulley at one end and tensed around the reel on the controlled arm at the other end. The choice of manufactured fibers, such as Vectran, for the cable prevents from minimal coiling curvature issues of metallic materials and ensures a low and linear elongation with respect to the transmitted torque. These technical design choices lead to a very transparent and compact transmission system.

The transparent and reversible cable-driven transmission system ensures a high-ratio integrated coupling of e.g. 1/10 with a relatively small footprint. It allows the constructor to use compact and standard motors to provide the high required torque. The generic design makes the transmission solution easy and fast to integrate to drive any revolute joint.

What is claimed is:

1. A haptic device, comprising:
(a) a paired parallel architecture formed by a first parallel translational manipulator and a second parallel translational manipulator together providing a 6-DOF motion of a reversible friction-less helical end-effector of the haptic device to which first and second manipulators are coupled in parallel; and
(b) the reversible friction-less helical end-effector attached to the first and second parallel translational manipulators through two serial kinematic chains enabling a transformation of displacements of the first and second parallel translational manipulators into translational and rotational motions of the reversible friction-less helical end-effector, and transmission of torques from the first and second parallel translational manipulators to generate 6-DOF haptic feedback in an operational space of the haptic device.

* * * * *